United States Patent [19]

Ciccarone

[11] Patent Number: 4,849,897
[45] Date of Patent: Jul. 18, 1989

[54] DEVICE FOR THE GOVERNING OF THE SUPERCHARGING PRESSURE OF AN INTERNAL COMBUSTION ENGINE

[75] Inventor: Angelo Ciccarone, Milan, Italy

[73] Assignee: Alfa-Lancia Industriale S.r.l., Arese, Italy

[21] Appl. No.: 28,392

[22] Filed: Mar. 20, 1987

[30] Foreign Application Priority Data

Mar. 20, 1986 [IT]  Italy .................................. 19815 A/86

[51] Int. Cl.$^4$ .................... F02B 37/12; F02B 37/00
[52] U.S. Cl. ........................ 364/431.08; 364/431.06; 123/564; 123/425; 60/602; 60/611
[58] Field of Search ................ 364/431.08, 431.06, 364/431.03; 123/559, 564, 425, 602; 60/611

[56] References Cited

U.S. PATENT DOCUMENTS

| | | | |
|---|---|---|---|
| 4,477,875 | 10/1984 | Suzuki et al. | 364/431.06 |
| 4,519,210 | 5/1985 | Iwamoto et al. | 60/602 |
| 4,548,038 | 10/1985 | Matsuki | 60/602 |
| 4,646,522 | 3/1987 | Mamiya et al. | 60/602 |
| 4,691,521 | 9/1987 | Hirabayashi et al. | 60/602 |
| 4,697,421 | 10/1987 | Otobe et al. | 60/602 |
| 4,727,847 | 3/1988 | Takeda et al. | 123/564 |

*Primary Examiner*—Parshotam S. Lall
*Assistant Examiner*—V. N. Trans
*Attorney, Agent, or Firm*—Charles E. Brown; Charles A. Brown

[57] ABSTRACT

The device allows the physical quantity used for the feedback-governing of the supercharging pressure of an internal combustion engine to be corrected as a function of ambient air temperature.

3 Claims, 2 Drawing Sheets

DEVICE FOR THE GOVERNING OF THE SUPERCHARGING PRESSURE OF AN INTERNAL COMBUSTION ENGINE

BACKGROUND OF THE INVENTION

1. Field of Invention

The present invention relates to a device for the governing of the supercharging pressure of a turbocharger fed internal combustion engine, wherein the same pressure is controlled by a feedback system as a function of preselected engine parameters.

The trend in the internal combustion engines is presently towards increasing compression ratios to the purpose of improving the thermodynamic efficiency and reducing the fuel consumption, e.g., by resorting to the turbochargers.

But increasing the supercharging pressure beyond certain limits is not possible, because of the tendency of the engine to knock, especially if the fuel is not endowed with high antiknocking characteristics, as well as in order to prevent the turbocharger from exceeding the maximum allowable revolution speeds.

Consequently, valves are used which are able to exhaust a portion of the supercharging air fed by the turbocharger, or valves able to divert from the turbines a portion of the exhaust gases of the engine.

Generally then, in the presence of knocking, the spark advance is adjusted, by delaying it, to the purpose of allowing the engine to operate under conditions far from the operating conditions which favour the phenomenon.

2. The Related Art

Devices for the governing of supercharging pressure of internal combustion engines are well known; both open-loop and closed-loop types thereof are currently available.

The devices of the second type are more complex, but surely much more advantageous, in as much as they allow the supercharging pressure to be optimized through a monitoring of the actual operating conditions of the engine; to the contrary, the devices of the first type oblige the designers to adopt a fixed limit value, determined by the most unfavourable operating conditions.

Also governor devices of the closed-loop type are known, which are accomplished by programmed microcomputers which are able to compute, as a function of selected engine parameters, the values of physical quantity of actuation, as well as the values of the physical quantity for feedback-control, to the purpose of verifying whether the actual value of the supercharging pressure or of a quantity correlated to it, corresponds to the control value.

The values of the above quantities are experimentally found under the different engine operating conditions, and are those which show a determined margin of safety relatively to the values which cause a combustion with knocking, with the spark advances being optimized relatively to the same phenomenon and for fuels of determined qualities.

These values are memorized in the permanent memory of the microcomputer as a function of the engine parameters preselected for defining the operating conditions of the same engine.

It has been found that these devices operate efficaciously when the engines operate with an ambient temperature higher than determined values generally higher than of ambient air under standard conditions.

To the contrary, for lower temperatures a certain undesired penalization was found to detriment of the power supplied by the engine because, due to the low temperatures of intaken air and of the consequent lower temperatures of compression end, also the pressure inside the combustion chamber assumes values having wider margins relatively to those which involve the knocking.

SUMMARY OF THE INVENTION

The purpose of the present invention is to provide an governor device by which no noticeable reductions occur in supplied power when the temperature of intaken air decreases below the standard temperature.

To that purpose we have integrated, according to the invention, the microcomputer devices of the prior art by accomplishing a correction in the control values of the supercharging pressure, or of a quantity correlated to it, such as the flowrate of feed air, as a function of ambient air temperature, by means of corrective coefficients stored in the permanent memory of a microcomputer.

The corrective coefficients, determined by way of experiment, assume increasing values, higher than 1, with decreasing values of ambient air temperature, and assume a constant value, equal to 1, for ambient air temperatures higher than a predetermined value.

Thus, with low ambient temperatures, the engines can operate with higher supercharging pressures, but with the necessary margins relatively to the knocking, and can hence supply higher powers.

Characteristics and advantages of the invention are now disclosed by referring to the hereto attached drawing wherein a preferred form of embodiment of the same invention is shown to exemplifying, non-limitative purposes.

BRIEF DESCRIPTION OF THE DRAWING

The drawing shows a turbocharger and an internal combustion engine, with the controls of this invention.

DETAILED DESCRIPTION OF THE INVENTION

Figure 1:
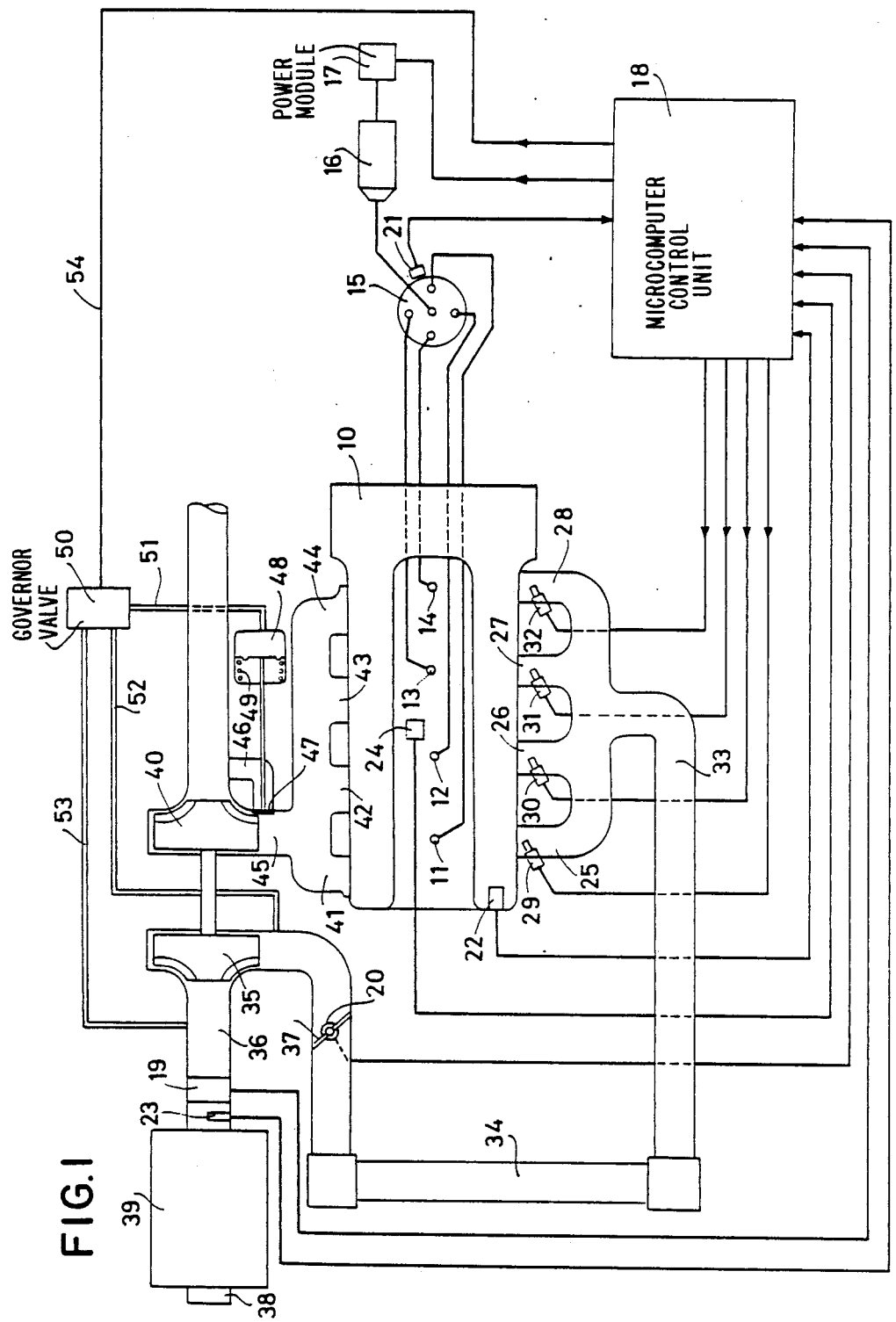
FIG. 1 illustrates the various components and monitoring system for the supercharged engine.

In FIG. 1 a supercharged engine is schematically shown which is equipped with a governor device according to the invention. The engine, indicated with 10, is a four-cylinder in-line engine. With 11, 12, 13, 14 indicated are the individual spark-plugs of the individual cylinders, which are connected with a microcomputer-control unit 18 via a distributor 15, a coil 16 and a power module 17. The control unit governs the spark advance as a function of preselected engine parameters, such as the flowrate of air fed to engine, the angle of the throttle valve/s, engine revolution speed, engine temperature, ambient air temperature, khocking, the signals of which are fed by sensors 19, 20, 21, 22, 23, 24, which are only schematically shown, in as much as they are per se known.

With 25, 26, 27, 28 indicated are the individual ducts which feed air to engine cylinders, and with 29, 30, 31, 32 the electroinjectors are shown, which are commanded to feed gasoline into said ducts by the same control unit 18, which carries out the governing of the injected gasoline amount as a function of the mentioned engine parameters.

The individual ducts 25–28 branch off a manifold 33 in its turn connected to an air/air heat exchanger 34, which cools the engine supercharging air, coming from turbocharger 35, through duct 36.

Inside duct 36, a throttle 37 is provided to the purpose of choking the same air, by being controlled by the usual accelerator pedal, not shown.

The turbocharger 35, which intakes air through the intake 38 and filter 39, is driven to revolve by the turbine 40, driven by the burned gases exhausted from the engine into ducts 41, 42, 43, 44 and into the manifold 45.

With 46 indicated is a turbine 40 bypass (short-circuit) duct, inside which a valve 47, commonly denominated as "waste-gate", is provided, actuated by a membrane-actuator 48.

The actuator membrane 48 is submitted to the difference between the atmospheric pressure, which acts on a face thereof, and the air pressure on delivery side or on intake side of turbocharger 35, which acts on its other face, as it will be better seen in the following. This pressure difference is balanced by the load of a calibrated spring 49.

The actuator 48 is connected, via the duct 51, to a three-way governor electrovalve, indicated with 50, which has the task of connecting it, via duct 52, to the delivery of turbocharger 35 and, through duct 53, to the intake duct 36 of the same turbocharger.

The electrovalve 50 is controlled, by means of lead 54, by a governor device, which is constituted by the same microcomputer of the control unit 18, programmed for governing the ignition and injection of engine 10.

In the permanent microcomputer memory, the computing programs which relate to the algorithms of governing of the engine supercharging pressure, and the tables of the data of the actuation quantities, of the control quantities and of the correction coefficients are contained.

In the particular case, the supercharging pressure is controlled by varying the amount of the exhaust gases which bypass turbine 40, by means of the opening and the closure of waste-gate 47, which is controlled by the electrovalve 50.

When electrovalve 50 is resting, it connects duct 51 with duct 52, and when it is energized, is places duct 52 in communication with duct 53.

In microcomputer permanent memory, the data is stored which relates to the energizing times and to the rest times of electrovalve 50, as a function of selected engine parameters, e.g., engine revolution speed and angle of throttle valve(s).

In the same memory, also contained is the data which relates to the feedback-control quantity, e.g., the flowrate of air fed to engine, always stored as a function of the same engine parameters, engine revolution rate and throttle valve(s) angle.

The feedback quantity could be the same supercharging pressure, in which case a special detector should be provided inside manifold 33.

Finally, in microcomputer's memory contained are the cofficients of correction of above-said control quantity as a function of ambient air temperature.

To the purpose of carrying out the governing of the supercharging pressure, the microcomputer reads the present values of engine revolution rate and throttle(s) angle as supplied by the detectors 20 and 21, and, on the basis of the computation programs and of the data stored in its memories, computes the energizing times and the rest times of electrovalve 50 and delivers the relating commands to the same electrovalve though the lead 54.

With the electrovalve 50 being resting, the pressure at compressor 35 delivery is applied to actuator 48, and valve 47 is commanded to open duct 46; thus, a portion of engine exhaust gases bypasses the turbine and the supercharging pressure decreases, due to the decreased revolution rate of turbocharge.

On the contrary, with the electro-valve 50 being energized, the pressure at turbocharger 35 delivery is diverted by the actuator 48, towards the intake of same turbocharger; thus the valve 47 remains closed and the whole volume of the burned gases flows through turbine 40.

The microcomputer controls the supercharging pressure by reading inside its memory the control value of flowrate of air intaken by the engine, by means of the present values of engine revolution rate and throttle valve(s) angle.

Furthermore, on the basis of the present value of ambient air temperature, supplied by sensor 23, the microcomputer determines the correction coefficient which has to be multiplied by the control flowrate value.

Then, the microcomputer verifies whether the so-computed value of the control flowrate concides or less with the present value supplied by the sensor 19; in case of difference, it sends to electrovalve 50 the commands which allow the supercharging pressure to be decreased or increased.

A similar operation procedure would be undertaken if, as the feedback-control quantity, the same supercharging pressure were used.

In the presence of a knocking signal coming from sensor 24, the microcomputer can be programmed to undertake an action by acting first on the spark advance, by delaying it, and subsequently, should the knocking signal continue, by reducing the supercharging pressure, according to the operating way of the governor device as above disclosed.

Figure 2:
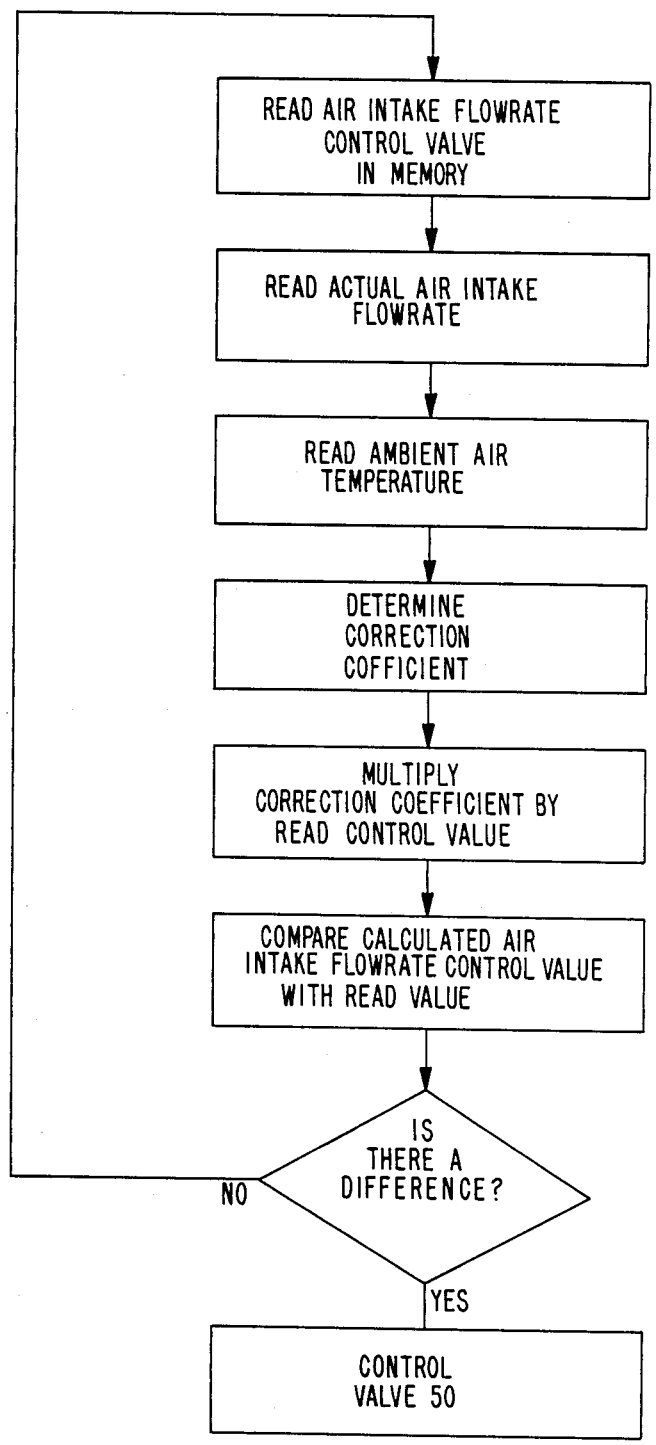
FIG. 2 illustrates the flow chart used in association with the computer to operate the supercharged engine of FIG. 1.

In order to carry out the above described functions, the microcomputer ultilizes the flow chart illustrated in FIG. 2 of the drawings. The first step involves reading current values of air intake flowrate and position of the control valve into memory. In the second step the actual air intake flowrate is read by the microcomputer. The third step involves reading the ambient air temperature supplied by sensor 23. In the fourth step, the microcomputer calculates the correction coefficient which is an indicator of actual conditions compared to the idea memory conditions. In the fifth step, the correction coefficient is multiplied by the read control value of step 1 to determine the calculated air intake flowrate value. The sixth step involves comparing the calculated air intake flowrate control value with the read control value stored in the memory of the microcomputer. If there is a difference, then in the seventh step the microcomputer effects movement of the control valve 50 to increase or decrease the supercharging effect upon the engine. One step seven has been completed the microcomputer repeats steps 1–6 again over and over to constantly regulate the system.

I claim:

1. A device for governing pressure of supercharging air of an internal combustion engine which is provided with at least one feed duct having a turbocharger positioned therein, at least one throttle valve for controlling airflow to the internal combustion engine, and at least one exhaust duct having a turbine positioned therein, the turbine being driven by exhaust gases discharged from the internal combustion engine and the turbine in turn driving the turbocharger, said device comprising first valve means positioned between the internal combustion engine and the turbine for regulating the flow of exhaust gases to the turbine and for influencing the pressure of the supercharging air, an actuator being connected to said first valve means for opening and closing said first valve means, a plurality of sensors for sensing preselected engine parameters which include at least temperature of ambient air being fed to the engine, second valve means being connected with said actuator and with a programmed microcomputer for controlling said actuator, said programmed microcomputer having a permanent memory stored with computation programs relating to algorithms for governing supercharging pressure in response to predetermined engine parameters, the permanent memory of the microcomputer having tables of data of energizing times and rest times of said second valve means responsive to at least a couple of the preselected engine parameters, the microcomputer being programmed to determine the excitation times and the rest times of said second valve means on the basis of present values of the engine parameters received from the sensors, and further to determine a value of feedback-control quantity based upon the present values of the engine parameters and correction coefficients which correspond to the ambient air temperature whereby the microcomputer is programmed to multiply the correction coefficients by the value of the feedback-control quality to determine if the computed value is greater or less than a predetermined ambient air temperature and if less than the predetermined air temperature then said second valve means is actuated to increase the supercharging pressure.

2. Device according to claim 1, wherein said first valve means are constituted by a valve provided inside a by-pass (short-circuit) duct for bypassing the duct inside which the turbine is provided and said actuator is of the membrane type and having faces of which on one side being biased by the atmospheric pressure and the load of a spring, and on the other side being biased by the air pressure at turbocharger delivery or intake, and said second valve means are constituted by a three-way electrovalve which is connected to the one face of said membrane selectively with the turbocharger delivery and turbocharger intake.

3. Device according to claim 1, wherein it is provided with sensors of engine revolution rate, throttle valve(s) angle and flowrate of air intaken by the engine, and stored in the permanent memory of the microcomputer, as part of the data of the feedback control are the values of air flowrate as a function of engine revolution rate and throttle valve(s).

* * * * *